(12) United States Patent
Fromm et al.

(10) Patent No.: US 10,144,206 B2
(45) Date of Patent: Dec. 4, 2018

(54) SYSTEM AND METHOD FOR REMOVING SUPPORT MATERIAL FROM A THREE-DIMENSIONAL PRINTED OBJECT

(71) Applicant: Xerox Corporation, Norwalk, CT (US)

(72) Inventors: Paul M. Fromm, Rochester, NY (US); Jeffrey J. Bradway, Rochester, NY (US); Timothy J. Clark, Weedsport, NY (US); Jorge M. Rodriguez, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 647 days.

(21) Appl. No.: 14/697,812

(22) Filed: Apr. 28, 2015

(65) Prior Publication Data

US 2016/0320123 A1 Nov. 3, 2016

(51) Int. Cl.
*F26B 5/00* (2006.01)
*B24B 31/06* (2006.01)
*B33Y 40/00* (2015.01)
*B29C 64/40* (2017.01)

(52) U.S. Cl.
CPC .............. *B33Y 40/00* (2014.12); *B24B 31/06* (2013.01); *B29C 64/40* (2017.08)

(58) Field of Classification Search
CPC ......... F26B 5/005; B24B 31/06; B33Y 40/00; B29C 64/40
See application file for complete search history.

(56) References Cited

U.S. PATENT DOCUMENTS

| | | | |
|---|---|---|---|
| 3,680,266 A * | 8/1972 | Shiplov | B24B 31/06 366/112 |
| 4,630,401 A * | 12/1986 | McNeil | B24B 31/06 451/113 |
| 4,795,496 A * | 1/1989 | Karaki | B24B 31/02 134/22.1 |
| 5,136,515 A | 8/1992 | Helinski | |
| 5,375,377 A * | 12/1994 | Kenton | B24B 31/06 451/22 |
| 6,206,755 B1 | 3/2001 | Samsel | |
| 6,277,011 B1 * | 8/2001 | Moreillon | B24B 31/05 451/32 |
| 6,585,577 B1 * | 7/2003 | Trahan | B24B 31/06 451/104 |
| 7,883,396 B2 * | 2/2011 | Potterfield | B24B 31/073 451/326 |
| 8,815,008 B2 | 8/2014 | Drake et al. | |
| 9,421,664 B1 * | 8/2016 | Yu | B24B 31/02 |
| 2003/0067098 A1 | 4/2003 | Newell et al. | |
| 2004/0242728 A1 | 12/2004 | Xu et al. | |
| 2013/0236706 A1 | 9/2013 | Xu et al. | |

FOREIGN PATENT DOCUMENTS

WO WO-2014134224 A2 * 9/2014 ............. B33Y 10/00

* cited by examiner

*Primary Examiner* — Alexander Markoff
(74) *Attorney, Agent, or Firm* — Maginot Moore & Beck LLP (57) ABSTRACT

A method of removing support material attached to an object printed with build material by a three-dimensional object printer achieves reliable removal of the support material in a short time. The method includes moving a first dry absorbent media into a volume within a vessel having at least one wall and moving the object into the volume of the vessel. The vessel is agitated to enable the first dry absorbent media to dislodge and absorb the support material from the object, and the first dry absorbent media is moved from the volume of the vessel.

8 Claims, 7 Drawing Sheets

SYSTEM AND METHOD FOR REMOVING SUPPORT MATERIAL FROM A THREE-DIMENSIONAL PRINTED OBJECT

TECHNICAL FIELD

The system and method disclosed in this document relate to printers that produce three-dimensional objects and, more particularly, to mechanisms for removing support material from objects printed by such printers.

BACKGROUND

Digital three-dimensional manufacturing, also known as digital additive manufacturing, is a process of making a three-dimensional solid object of virtually any shape from a digital model. Three-dimensional object printing is an additive process in which one or more printheads eject successive layers of material on a substrate in different shapes. Typically, ejector heads, which are similar to printheads in document printers, include an array of ejectors that are coupled to a supply of material. Ejectors within a single ejector head can be coupled to different sources of material or each ejector head can be coupled to different sources of material to enable all of the ejectors in an ejector head to eject drops of the same material. Materials that become part of the object being produced are called build materials, while materials that are used to provide structural support for object formation, but are later removed from the object are known as support materials. The build materials are typically formed of UV curable materials that create thermosets after curing. Three-dimensional object printing is distinguishable from traditional object-forming techniques, which mostly rely on the removal of material from a work piece by a subtractive process, such as cutting or drilling.

Figure 7:
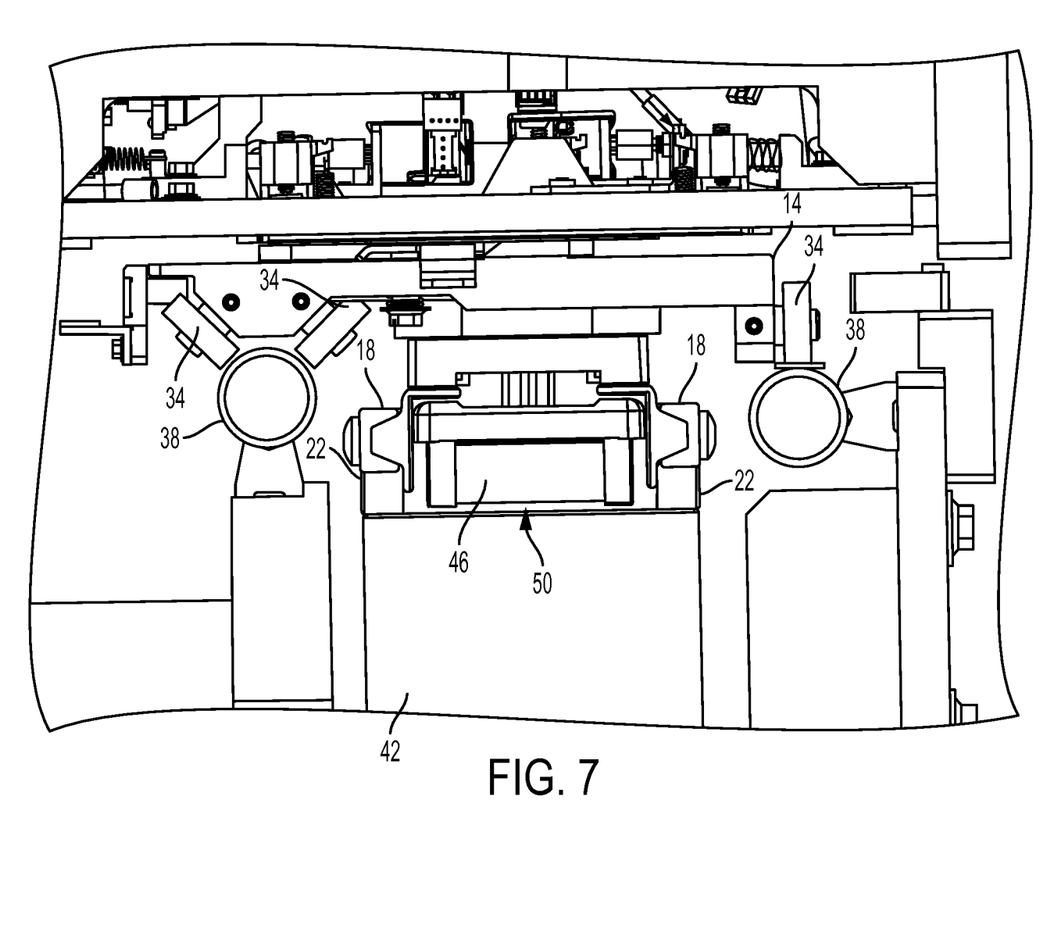
FIG. 7 is a front elevational view of a prior art three-dimensional object printing system.
Figure 8:
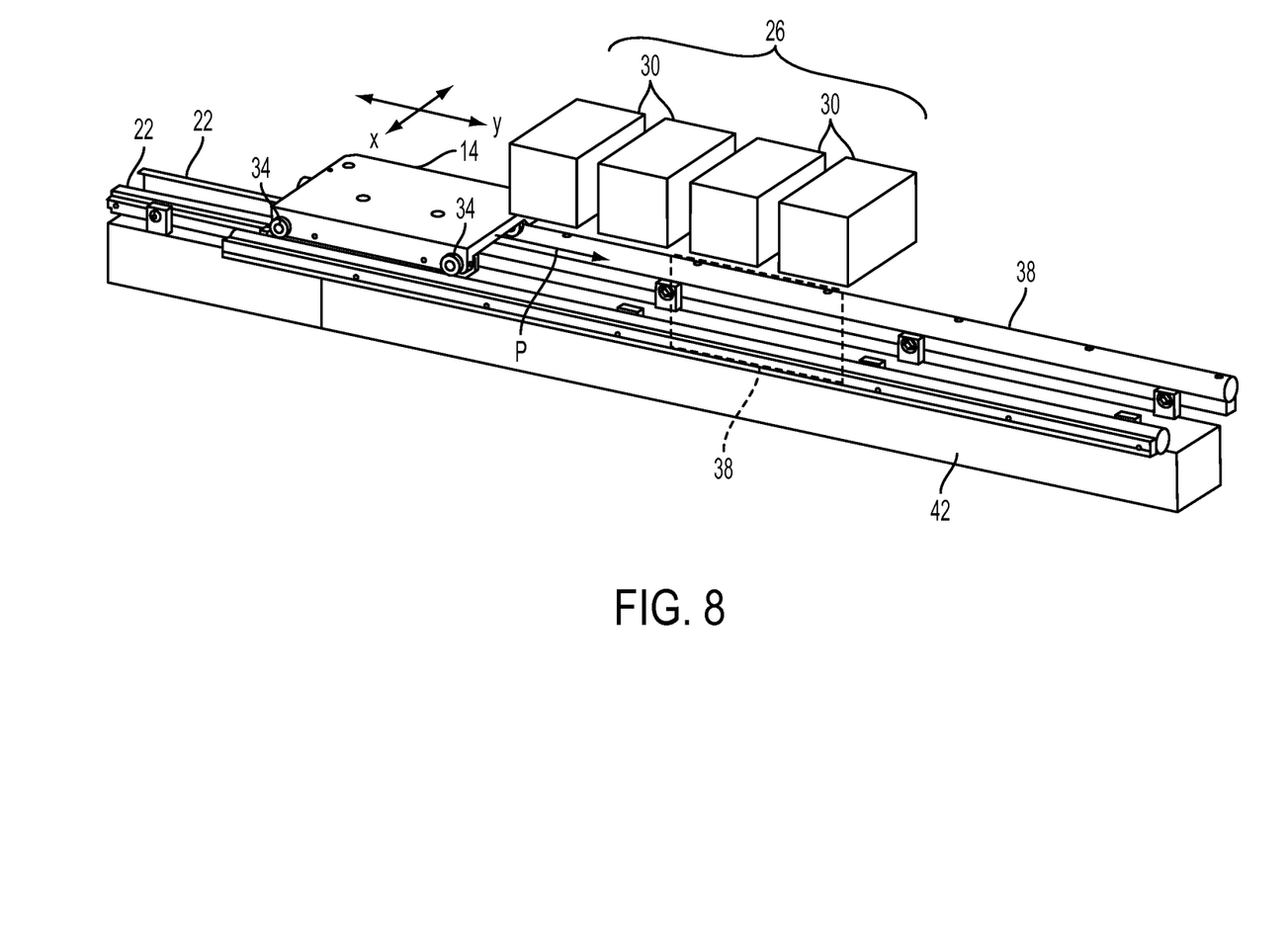
FIG. 8 is a side perspective view of the prior art three-dimensional object printing system of FIG. 7.

A previously known three-dimensional object printing system 10 is shown in FIG. 8. In the view depicted in that figure, a platform 14, called a cart, includes surfaces 18 (FIG. 7) that slide upon track rails 22 to enable the cart to move in a process direction P between printing stations, such as the printing station 26 shown in FIG. 8. Alternatively, carts can include wheels configured to roll along tracks, or other types of acceptable mobility mechanisms. The rails 22 terminate at a position underneath the cart 14 as shown in FIG. 8. Printing station 26 includes four ejector heads 30 as shown in the figure, although fewer or more ejector heads can be used in a printing station. Once the cart 14 reaches the printing station 26, the cart 14 transitions to precision rails 38, which begin at the termination of the rails 22, to enable bearings 34 to roll upon precision rails 38. Precision rails 38 are cylindrical rail sections that are manufactured within tight tolerances to help ensure accurate placement and maneuvering of the cart 14 beneath the ejector heads 30. The rails 38 terminate past the printing station 26, as shown in FIG. 8, where another set of rails 22 (not shown) begin and then lead to the next printing station. Linear electrical motors are provided within housing 42 to interact with a magnet positioned with housing 46 connected to the lower surface of the cart 14, as described below, to propel the cart as the surfaces 18 slide along the track rails 22 and then, once the bearings 34 transition to the precision rails 38, maneuver the cart 14 on the precision rails. As the cart 14 moves on the rails 38 past the printing station 26, the printheads eject material onto the upper surface of the cart in synchronization with the motion of the cart. Additional motors (not shown) move the printing station 26 vertically with respect to the cart 14 and in an X-Y plane parallel to the upper surface of the cart as layers of material accumulate to form an object. Alternatively, a mechanism can be provided to move an upper surface of the cart 14 on which the object is being formed vertically and in the X-Y plane to enable the layers to form the object. Once the printing to be performed by a printing station is finished, the cart 14 is moved to another printing station for further part formation, layer curing or other processing.

An end view of the system 10 is shown in FIG. 7. That view depicts in more detail the surfaces 18 on which the cart 14 slides the track rails 22. Bearings 34 of the cart 14 are positioned on the precision rails 38 in an arrangement that facilitates accurate positioning of the build platen on the cart 14. Specifically, bearings 34 are positioned at a right angle to one another on one of the rails 38 to remove 4 degrees of freedom of the cart 14, while the other bearing 34 rests on the other rail 38 to remove one more degree of freedom. Linear motors within the housing 42 generate electromagnetic fields that interact with the magnet in housing 46 to move the cart 14 over an upper surface 50 of the housing 42. Gravity and magnetic attraction between the linear motors and the magnet hold the bearings 34 in contact with the rails 38.

Once the three-dimensional object printing system has produced an object, the object must be post-processed to remove the support material. The support material is typically a waxy material having a melting point that is substantially less than the melting point of the build material or the point at which the build material would otherwise denature. As a result, post-processing can be performed by heating the object to a temperature that is greater than the melting point of the support material, but less than the melting point of the build material. At this temperature, the support material melts away from the object, while the build material remains. One problem with simply heating the object to remove the support material, however, is that some of the support material may remain trapped in holes or indentations in the object, and may remain attached to the build material.

In some conventional three-dimensional printing systems, the object is placed in a vat of hot wax and agitated. After being placed in the wax, however, the object must be washed with hot soapy water to remove the wax from the object. In some instances, pockets of wax may remain on the object even after being washed. Additionally, the hot soapy water must be dried after washing the object, increasing the overall time required to complete construction of an object.

As a result, improvements in systems and methods for removing support material from an object produced in a three-dimensional object printing system would be beneficial.

SUMMARY

In one embodiment, a method of removing support material attached to an object printed with build material by a three-dimensional object printer achieves reliable removal of the support material in a short time. The method includes moving a first dry absorbent media into a volume within a vessel having at least one wall and moving the object into the volume of the vessel. The vessel is agitated to enable the first dry absorbent media to dislodge and absorb the support material from the object, and the first dry absorbent media is moved from the volume of the vessel.

In another embodiment, a system removes support material attached to an object printed with build material by a three-dimensional object printer quickly and reliably. The system includes a vessel defining a volume in which a dry absorbent media is located, the dry absorbent media being configured to absorb support material from the object. An actuator is operably connected to the vessel, the actuator being configured to agitate the vessel to enable the dry absorbent media to dislodge and absorb the support material from the object.

BRIEF DESCRIPTION OF THE DRAWINGS

The foregoing aspects and other features of the system and method for removing support material are explained in the following description, taken in connection with the accompanying drawings.

DETAILED DESCRIPTION

For a general understanding of the environment for the system and method disclosed herein as well as the details for the system and method, reference is made to the drawings. In the drawings, like reference numerals have been used throughout to designate like elements.

As used herein, the term "build object" refers to an object produced by a three-dimensional object printing system. A build object is typically formed of a combination of build material and support material. As used herein, the term "build material" refers to material deposited by the three-dimensional object printing system that is a part of the final build object. The term "support material" refers to material deposited by the three-dimensional object printing system in order to supply support for the build object during the additive manufacturing process. The support material is removed from the build object once the three-dimensional object printing is complete in order to produce the final build object. The support material is typically formed of a soft resin or wax material.

Figure 1A:
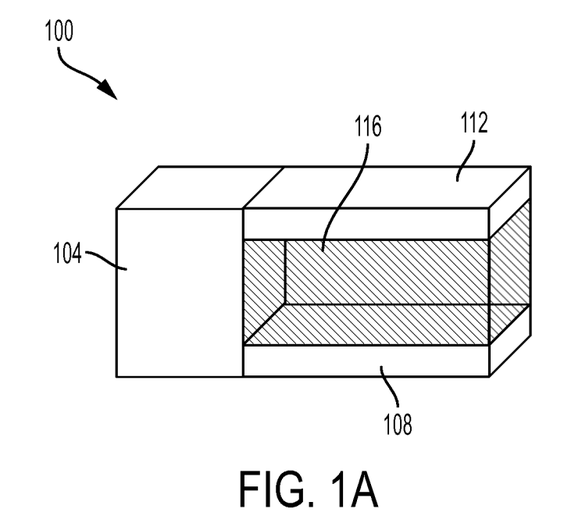
FIG. 1A is a perspective view of a build object having support material attached thereto.
Figure 1B:
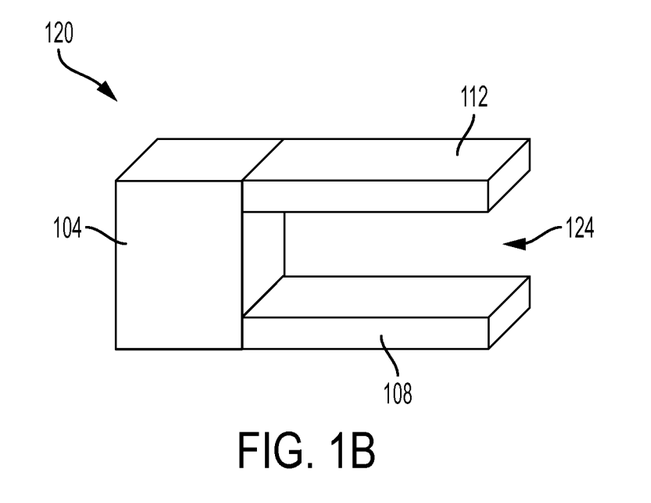
FIG. 1B is a perspective view of the build object of FIG. 1A with the support material removed.

FIG. 1A illustrates an example of a build object 100 having a first solid portion 104, a first flange 108, and a second flange 112, all of which are formed of build material. The build object 100 is configured to be produced in a three-dimensional object printing system, for example by the three-dimensional object printing system 10 described above, which builds the object 100 in horizontal layers. In the orientation of the object 100 as shown in FIG. 1A, support material 116 must be deposited by the three-dimensional object printing system between the first and second flanges 108, 112 to provide a base on which the second flange 112 is subsequently deposited. After the build object 100 is formed by the three-dimensional object printing system, the support material 116 is removed to produce the completed or final build object 120, shown in FIG. 1B. Removal of the support material 116 leaves a gap 124 between the first and second flanges 108, 112.

Figure 2:
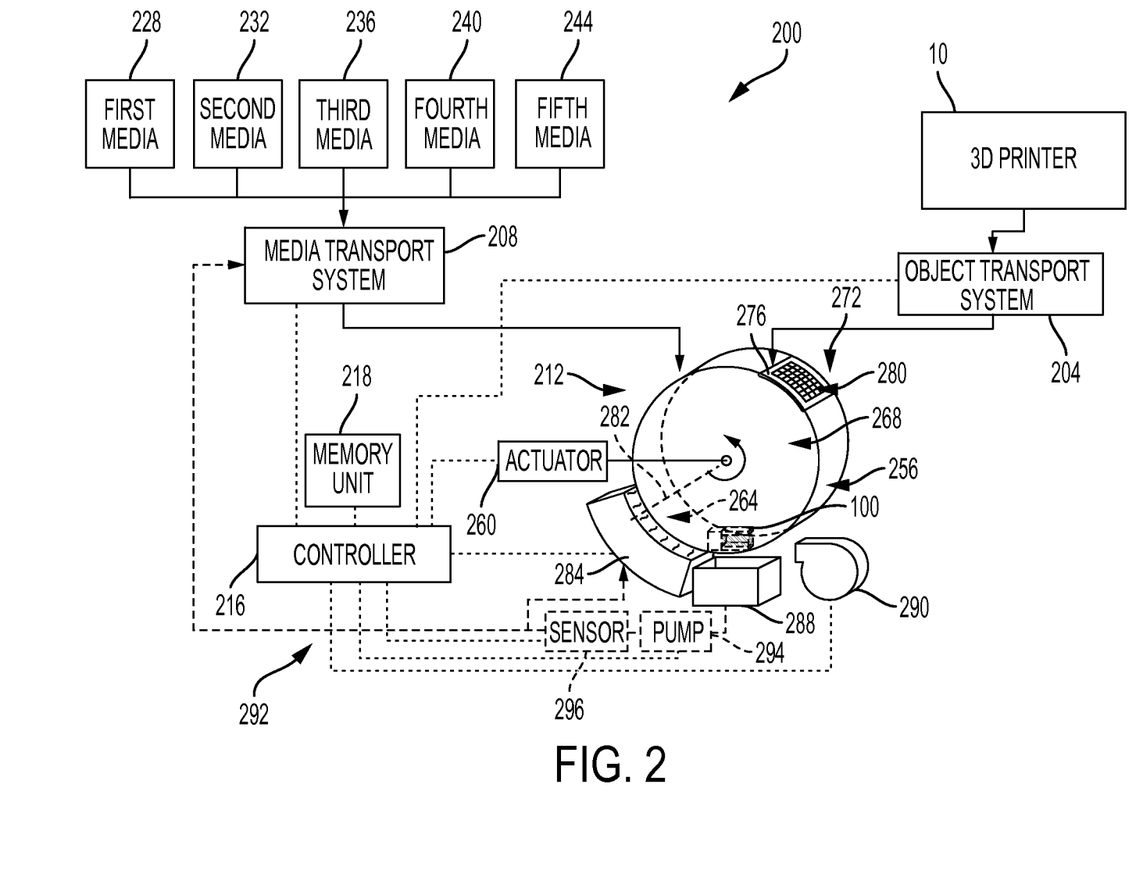
FIG. 2 is a schematic view of a support material removal system having a cylindrical drum as the agitation vessel.

FIG. 2 illustrates a support material removal system 200 configured to remove support material from a build object, for example build object 100, after the build object 100 is produced by a three-dimensional (3D) object printer, for example the three-dimensional object printing system 10 described above. The support material removal system 200 includes an object transport system 204, a media transport system 208, an agitation system 212, and a controller 216.

The object transport system 204 is operatively connected to the 3D printer 10, and is configured to transport build objects 100 produced by the 3D printer 10 to the agitation system 212. In one embodiment, the object transport system 204 includes the cart 14 on which the object is produced. In other embodiments, the object transport system 204 can include a conveyor system, one or more robotic arms, an elevator system, a carousel, a gravity transport system, or any combination of the above.

The media transport system 208 is configured to transport dry absorbent media to the agitation system. As used herein, the term "dry absorbent media" refers to a medium that is configured to remove particles of support media from the build object. In various embodiments, the dry absorbent media can include one or more of: wood chips or pellets; organic byproducts such as chopped corn husks, corn cobs, or nut shells; de-inked recycled paper pulp, which can be formed into small soft pellets; or inorganic pellets of clay, earth, or minerals, for example kitty litter or commercial oil absorbent products.

In the embodiment illustrated in FIG. 2, the media transport system 208 is configured to connect to five different dry absorbent media storage bins 228, 232, 236, 240, 244, though more or fewer storage bins are used in other embodiments. The moisture content of the dry absorbent media is progressively less from the first media bin 228 to the fifth media bin 244. The media transport system 208 can include one or more of a pump, a conveyor system, one or more robotic arms, an elevator system, a carousel, or a gravity transport system.

Figure 3:
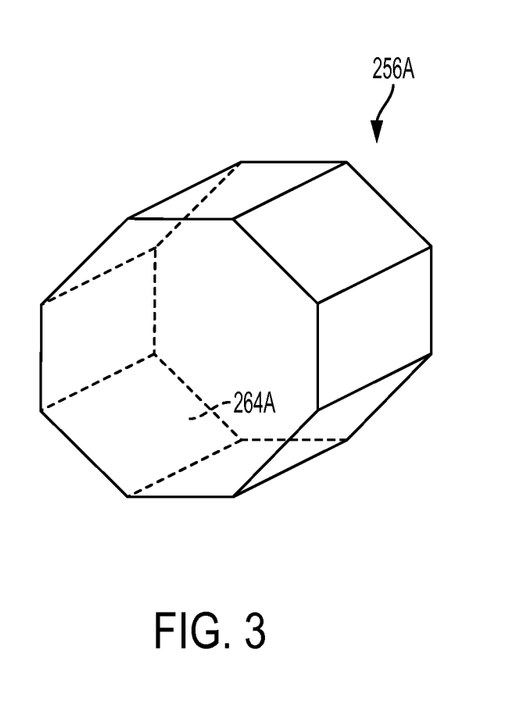
FIG. 3 is a perspective view of an octagonal drum that is used in place of the cylindrical drum in the support material removal system of FIG. 2.
Figure 4:
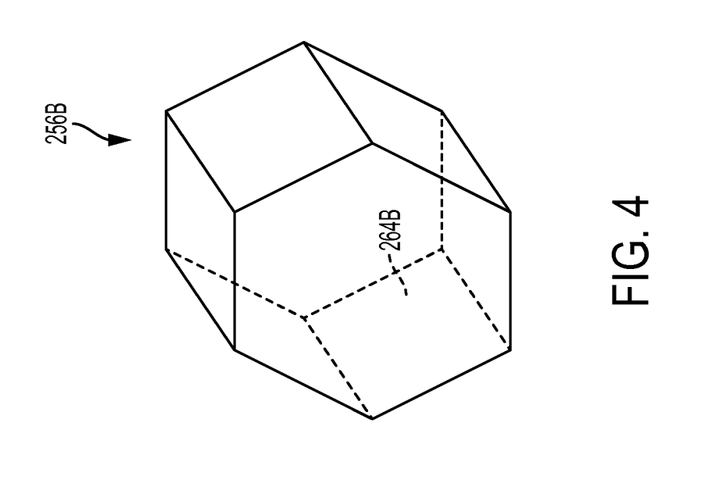
FIG. 4 is a perspective view of a hexagonal drum that is used in place of the cylindrical drum in the support material removal system of FIG. 2.

The agitation system 212 includes an agitation vessel 256 and an actuator 260. In the embodiment illustrated in FIG. 2, the agitation vessel 256 is a cylindrical drum having an outer cylindrical wall 264 defining an interior volume 268, into which the object transport system 204 feeds the build object 100 and the media transport system 208 feeds the dry absorbent media. In other embodiments, the agitation vessel may be formed as an octagonal drum 256A (FIG. 3) having eight outer walls 264A or a hexagonal drum 256B (FIG. 4) having six outer walls 264B.

Referring back to FIG. 2, the cylindrical wall 264 includes an opening 272 including a door 276 covering the opening. The door 276 is configured to be opened to enable the object transport system 204 and the media transport system 208 to deposit the build object 100 and the dry absorbent media, respectively, into the interior volume 268 of the agitation vessel 256. The door 276 includes a mesh screen 280 having opening size that is greater than a diameter of the particles of the dry absorbent media and smaller than the size of the build object 100. The screen 280 therefore enables the dry absorbent media to fall out of the agitation vessel 256 while the build object 100 is retained therein. In some embodiments, the screen 280 is covered by a removable cover to prevent the dry absorbent media from falling from the agitation vessel 256 until tumbling is complete. The actuator 260 is operably connected to the agitation vessel 256 and is configured to rotate the agitation vessel 256 about a horizontal axis 282. In some embodiments, the actuator 260 is a rotational electric motor, while in other embodiments the actuator 260 is a stepper motor, a hydraulic actuator, or other type of actuator.

The agitation system 212 can optionally include one or more heaters 284, a used media receptacle 288, a blower 290, and a media recycle system 292. The heater 284 heats the agitation vessel 256 to melt the support material on the build object 100 at least partially so it is in a more pliable state for removal by the dry absorbent media. In some embodiments, the heater 284 includes a resistance heater, while in other embodiments, the heater 284 includes a thermoelectric element or a combustion chamber in which gas, wood, used dry absorbent media, or other combustibles are burned. The blower 290 is configured to move air across the build object 100 to separate dry absorbent media from the build object 100 after the support material is removed. In the illustrated embodiment, the blower 290 is positioned to blow into the agitation vessel 256 through the screen 280. In other embodiments, the blower 290 is configured to blow into a separate opening in the agitation vessel 256. In some embodiments, the blower is configured to blow air on two additional screens (not shown), and the object transport system 204 moves the build object 100 between the additional screens after removal of the support material.

The recycling subsystem 292 enables the used dry absorbent media to be reused in the system 200. The recycling subsystem 292 receives the dry absorbent media from the used media receptacle 288. In some embodiments, the recycling subsystem 292 includes a pump 294, which pumps the used dry absorbent media with the support material attached to the media transport system 208 for reuse. In another embodiment, the media transport system 208 functions to move the used dry absorbent media through the recycle subsystem 292. In one embodiment, the recycling subsystem 292 includes a sensor 296 that detects moisture content or a content of support material in the used dry absorbent media. Based upon the moisture or support material content of the used dry absorbent media, the recycling subsystem 292 is configured to return the used dry absorbent media to one of the media bins 228, 232, 236, 240, 244, to the media transport system 208, or to the heater 264, where the used dry absorbent media can be burned to produce heat.

The controller 216 is operably connected to the object transport system 204, the media transport system 208, the actuator 260, the heater 284, the blower 290, the pump 294, and the sensor 296. Operation and control of the various components and functions of the support material removal system 200 are performed with the aid of the controller 216. The controller 216 is implemented with a general or specialized programmable processor that executes programmed instructions. In some embodiments, the controller includes more than one general or specialized programmable processor. The instructions and data required to perform the programmed functions are stored in a memory unit 218, which can be integrated with the controller 216 or external to and operably connected to the controller 216. The processor, memory 218, and interface circuitry configure the controller 216 to perform the functions and processes described below. These components can be provided on a printed circuit card or provided as a circuit in an application specific integrated circuit (ASIC). Each of the circuits can be implemented with a separate processor or multiple circuits can be implemented on the same processor. Alternatively, the circuits can be implemented with discrete components or circuits provided in VLSI circuits. Also, the circuits described herein can be implemented with a combination of processors, ASICs, discrete components, or VLSI circuits.

In operation, the controller 216 controls the object transport system 204 to move one or more build objects 100 produced by the 3D printer 10 into the volume 268 of the agitation vessel 256. The controller 216 also controls the media transport system 208 to move the first dry absorbent media from the first bin 228 into the volume 268. In some embodiments, the volume of first dry absorbent media is greater than the total volume of the build objects 100 in the volume to provide adequate cushioning for the build objects 100 and avoid abrasion of the build material during agitation. The controller 216 then controls the actuator 260 to rotate the agitation vessel 256 and controls the heater 284 to heat the agitation vessel 256. The heat renders the support material on the build objects 100 more pliable and, in some embodiments, can melt the support material from the build objects 100. Rotation of the agitation vessel 256 tumbles the build objects 100 and dry absorbent media, which absorbs the support material from the build objects 100.

Once the support material has been absorbed, the controller deactivates the actuator 260 with the cylindrical wall 264 in a position at which the screen 280 is positioned opposite the used media receptacle 288. The first dry absorbent media falls through the screen into the used media receptacle 288. In embodiments including the blower 290, the controller activates the blower to blow air across the build objects 100 and facilitate separation of the first dry absorbent media from the build objects 100.

In embodiments having the recycling subsystem 292 and sensor 296, the moisture content of the used dry absorbent media is then sensed by the sensor 296. Based upon the moisture content of the used dry absorbent media, the controller 216 determines whether the used dry absorbent media is suitable to be reused. If the used media is suitable for reuse, the controller 216 operates the recycling subsystem 292 or the pump 294 to move the used media to one of the media bins 228, 232, 236, 240, 244 for reuse. In some embodiments, if the used media has a moisture content that is too high such that the media is not suitable for reuse, the controller 216 operates the recycling subsystem 292 or the pump 294 to move the used dry absorbent media to the heater 284 to be combusted to heat the agitation vessel 256, provided the heater 284 uses combustion to generate heat. If the heater 284 is an electrical heater, the used media is transferred to a waste receptacle if the used media is not capable of being reused.

After removal and optional recycling of the first dry absorbent media, the controller 216 controls the media transport system 208 to move the second dry absorbent media from the second media bin 232 into the volume 268 of the agitation vessel 256. The second dry absorbent media has lower moisture content than the first dry absorbent media so the second dry absorbent media can absorb more support material from the build object 100. The vessel 256 is agitated and heated, and then the second dry absorbent media is removed from the vessel 256 and recycled through the recycling subsystem 292. This process repeats for the third, fourth, and fifth dry absorbent media, each of which has lower moisture content than the dry absorbent media previously agitated with the build object 100. In the illustrated embodiment, five dry absorbent media are used to remove the support material from the build objects. The reader should appreciate, however, that any desired number of media may be used in different embodiments to achieve removal of the support material from the build objects 100. Alternatively, media from less than all of the media bins can be used to process build objects 100.

Figure 5:
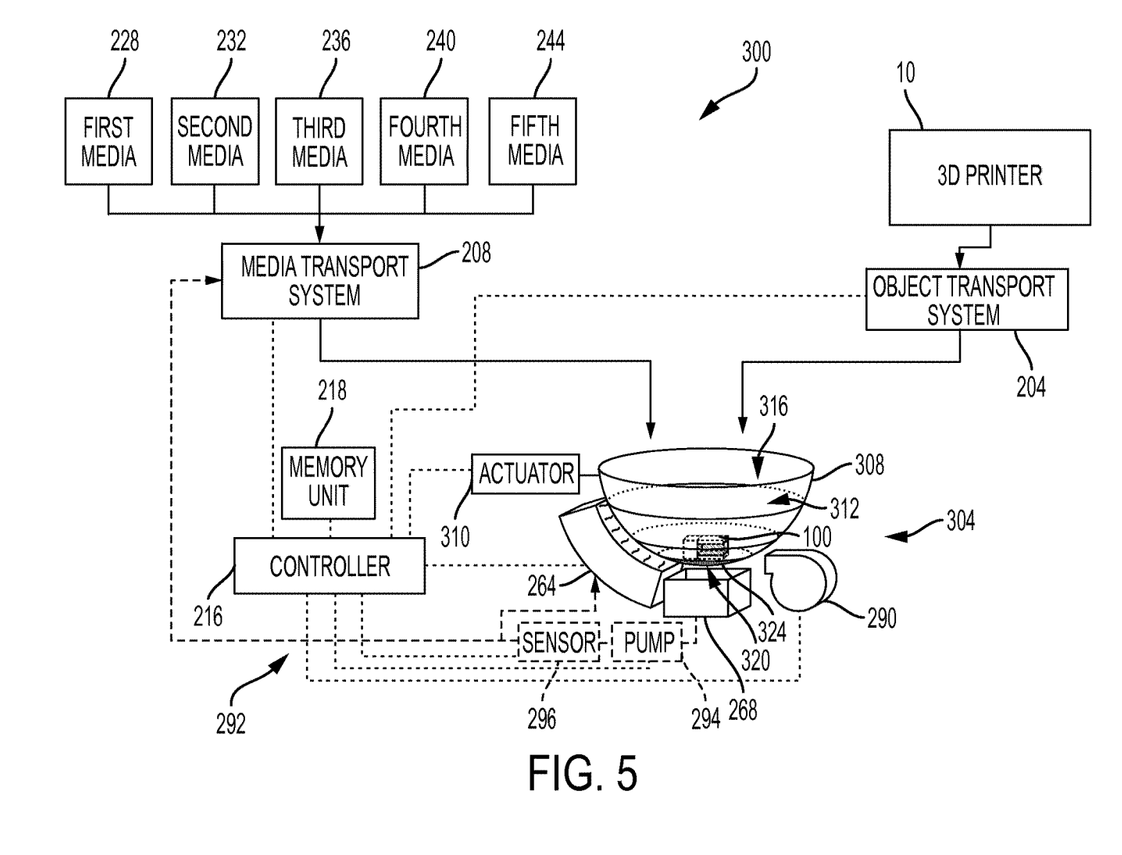
FIG. 5 is a schematic view of a support material removal system having a vibratory bowl as the agitation vessel.

FIG. 5 illustrates another embodiment of a support material removal system 300. The support material removal system 300 is similar to the system 200 described above with reference to FIG. 2, except that the agitation system 304 is configured differently. As such, only the agitation system 304 is described in detail below. The agitation system 304 includes an agitation bowl 308 and a vibratory actuator 310. The agitation bowl 308 defines an interior volume 312 and includes an open upper end 316, through which the object transport system 204 and the media transport system 208 are configured to transport the build object 100 and the dry absorbent media, respectively, into the interior volume 312 of the agitation bowl 308. The agitation bowl 308 defines a closed end 320, which is covered by a mesh screen 324 having mesh openings that are greater than the particle diameter of the dry absorbent media and less than the dimensions of the build object 100.

In the illustrated embodiment, the agitation bowl 308 is shaped approximately as a hemisphere. In other embodiments, the agitation bowl can have a toroidal shape, a cylindrical shape, a conical shape, or another suitable shape. In some embodiments, the screen 324 is replaced with a sieve conforming to the shape of the bowl 308. The sieve retains the build objects 100 during vibration, while allowing the dry absorbent media to fall into the bowl 308.

Operation of the support material removal system 300 of the embodiment of FIG. 5 is similar to the operation of the system 200 described above with reference to FIG. 2. In the embodiment of FIG. 5, however, rather than rotating the agitation vessel, the vibratory actuator 310 is configured to vibrate the agitation bowl 308 in a reciprocating manner to agitate the build object 100 with the dry absorbent media. Vibration of the agitation bowl 308 moves the dry absorbent media with the build objects 100, enabling the dry absorbent media to absorb the support material from the build objects 100. The used dry absorbent media then falls from the bowl 308 into the used media receptacle 268 for recycling.

Figure 6:
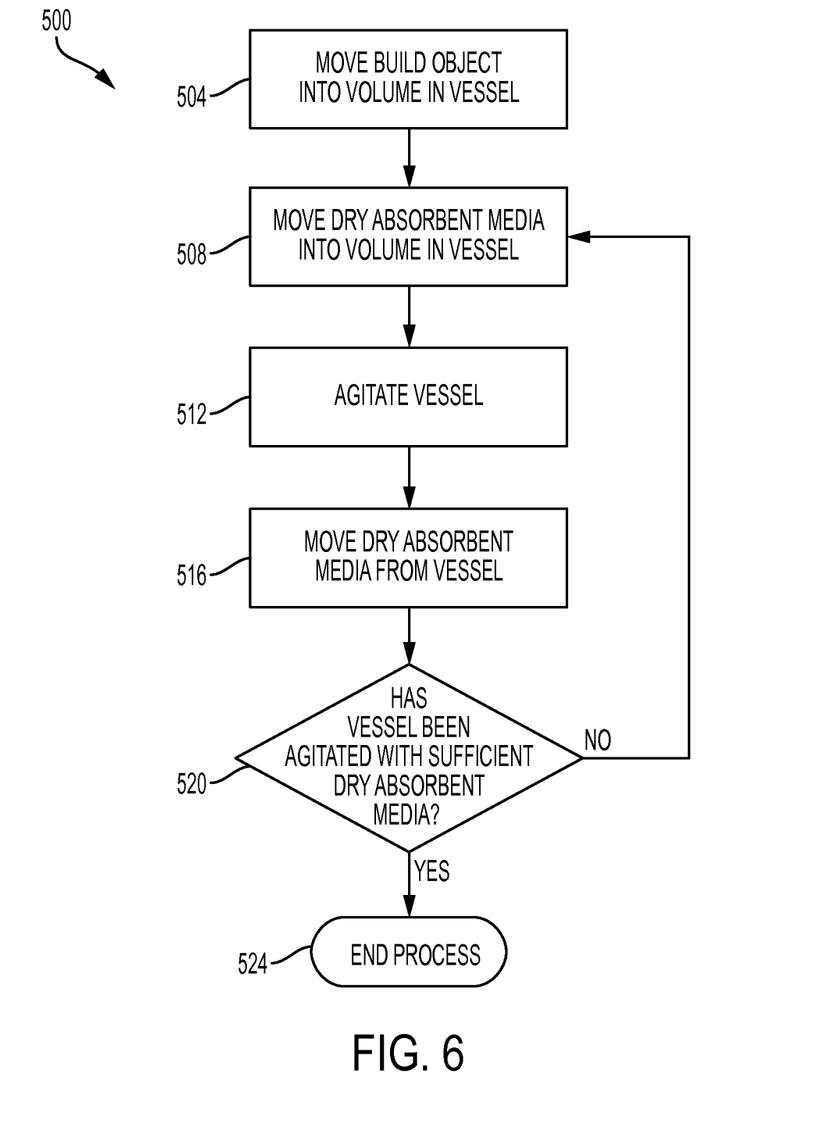
FIG. 6 is a process diagram of a process of removing support material from a build object.

FIG. 6 is a flow diagram of a process 500 of removing support material from a build object 100. The process 500 refers to the controller 216 executing program instructions stored in the memory 218 to control the object transport system 204, media transport system 208, actuator 260, 310, heater 284, blower 290, and sensor 296 to perform the functions described above. The process 500 begins with the controller 216 operating the object transport system 204 to move the build object 100 into the volume 268, 310 of the vessel 256, 308 (block 504). The controller 216 also operates the media transport system 208 to move the dry absorbent media into the volume 268, 310 of the vessel 256, 308 (block 508). In some embodiments, the build object is moved into the volume 268, 310 before the dry absorbent media, while in other embodiments, the build object is moved into the volume 268, 310 concurrently with or subsequently to the dry absorbent media being moved into the volume 268, 310 of the vessel 256, 308.

The controller 216 then activates the actuator 260, 310 to agitate the agitation vessel 256, 308 (block 512). As discussed above, if the vessel is a drum 256, 256A, 256B, the actuator 260 is configured to rotate the drum 256, 256A, 256B to tumble the build object 100 with the dry absorbent media. Alternatively, in embodiments in which the vessel is a vibratory bowl 308, the actuator 310 vibrates the bowl 308 to agitate the build object 100 with the dry absorbent media.

In other embodiments, the actuator can be configured to shake the vessel or perform a combination of vibrating, rotating, and shaking the vessel. The dry absorbent media is then removed from the vessel 256, 308 (block 516). In some embodiments, the dry absorbent media is removed during the agitation, for example through the screen 280, 324. In other embodiments, the screen 280, 324 is covered, and a flap or door is opened to enable the dry absorbent media to fall from the vessel after the agitation is complete.

The controller 216 then queries whether the vessel 256, 308 has been agitated with sufficient dry absorbent media (block 520). For example, in the embodiments described above with reference to FIG. 2 and FIG. 5, the systems 200, 300 include five dry absorbent media having varying moisture content. The controller 216 can be configured to agitate the objects 100 with each of the dry absorbent media in sequence from highest moisture content to lowest moisture content. If the build object 100 has not been agitated with sufficient dry absorbent media, the process continues from block 508 with another dry absorbent media being moved into the vessel 256, 308. If the build object 100 has been agitated with sufficient dry absorbent media, the process terminates (block 524).

In some embodiments, after removal of the support material from the build object, a polishing material is moved into the vessel 256, 308 and agitated to polish the completed build objects 100. In further embodiments, the removed support material is used as the polishing material to smooth the build objects 100.

It will be appreciated that variants of the above-disclosed and other features and functions, or alternatives thereof, may be desirably combined into many other different systems, applications or methods. Various presently unforeseen or unanticipated alternatives, modifications, variations, or improvements therein may be subsequently made by those skilled in the art, which are also intended to be encompassed by the following claims.

What is claimed is:

1. A system for removing support material attached to a three-dimensional (3D) object printed with build material by a three-dimensional (3D) object printer comprising:

an object transporter configured to move the 3D object having the attached support material from the 3D object printer to a support material remover;

a media transporter configured to move dry absorbent media to the support material remover;

a plurality of dry absorbent media sources, each source of dry absorbent media being configured to release dry absorbent media onto the media transporter;

the support material remover having:

a vessel having an interior volume and an opening into the interior volume of the vessel, the opening enabling the object transporter to place the 3D object into the interior volume of the vessel and enabling the media transporter to place the dry absorbent media into the interior volume of the vessel;

an actuator operably connected to the vessel, the actuator being configured to agitate the vessel and urge the dry absorbent media into contact with the support material attached to the 3D object in the interior volume of the vessel to dislodge and absorb the support material from the 3D object;

a receptacle configured to receive dry absorbent media from the vessel;

a sensor configured to generate a signal indicative of an amount of moisture in the dry absorbent media received by the receptacle from the vessel;

a recycled dry absorbent media transporter configured to move the dry absorbent media received from the receptacle to one of the dry absorbent media sources or the media transporter; and a controller operatively connected to the object transporter, the media transporter, the sensor, the recycled dry absorbent media transporter, and the actuator of the support material remover, the controller being configured to operate the object transporter to place the object in the vessel of the support material remover, to operate the media transporter to move dry absorbent media from one of the dry absorbent media sources into the vessel, to operate the actuator of the support material remover to urge the dry absorbent media into contact with the 3D object as the vessel is agitated, and to determine whether to operate the recycled dry absorbent media transporter to move dry absorbent media from the receptacle to the one dry absorbent media source from which the dry absorbent media was obtained based on a level of moisture in the dry absorbent media indicated by the signal generated by the sensor.

2. The system of claim 1, the support material remover further comprising:

a heater configured to heat the vessel to at least partially melt the support material attached to the 3D object within the interior volume of the vessel; and the controller is operatively connected to the heater, the controller is further configured to operate the heater to melt the support material.

3. The system of claim 1, wherein the actuator is configured to rotate the vessel about a horizontal axis;

the vessel is a drum having an outer wall that is oriented to enable gravity to hold the dry absorbent media and the object against the outer wall while the vessel rotates about the horizontal axis; and the controller is configured to operate the actuator to rotate the vessel about the horizontal axis.

4. The system of claim 3, the drum of the support material remover further comprising:

a door located in the outer wall of the drum that covers the opening selectively, the door further comprising:

a mesh having pores that are greater in diameter than a particle size of the dry absorbent media and less than a dimension of the object.

5. The system of claim 1 wherein the actuator is configured to vibrate the vessel with a reciprocating motion; and the opening of the vessel is an open end that is oriented to enable gravity to hold the dry absorbent media and the object against a closed end of the vessel while the vessel vibrates.

6. The system of claim 5, the vessel further comprising:

an opening in the closed end of the vessel that is covered by a mesh having pores that are greater than a particle size of the dry absorbent media and less than a dimension of the object.

7. The system of claim 1 further comprising:

a blower configured to direct air towards the object within the interior volume of the vessel to remove dry absorbent media from the 3D object after the dry absorbent media has exited the interior volume of the vessel.

8. The system of claim 1, the actuator being further configured to:

agitate the vessel with a predetermined force that enables the dry absorbent media not to abrade a surface of the object.

\* \* \* \* \*